United States Patent [19]

Ban et al.

[11] Patent Number: 4,766,864
[45] Date of Patent: Aug. 30, 1988

[54] FUEL INJECTION CONTROL BASED ON SPILL PORT OPENING TIMING CORRECTION

[75] Inventors: Mitsuru Ban, Gamagori; Masahiko Miyaki, Oobu; Takashi Hasegawa, Tajimi; Fumiaki Kobayashi, Toyota; Mamoru Kobashi, Aichi, all of Japan

[73] Assignees: Nippondenso Co., Ltd., Kariya; Toyota Jidosha Kabushiki Kaisha, Toyota, both of Japan

[21] Appl. No.: 845,111

[22] Filed: Mar. 27, 1986

[30] Foreign Application Priority Data

Mar. 29, 1985 [JP] Japan .................... 60-68108

[51] Int. Cl.[4] ............................................. F02M 39/00
[52] U.S. Cl. .................................... 123/357; 123/381; 123/506
[58] Field of Search ............... 123/506, 458, 357–359, 123/500, 501, 381

[56] References Cited

U.S. PATENT DOCUMENTS

| 4,495,915 | 1/1985 | Shinoda et al. | 123/357 |
| 4,583,506 | 4/1986 | Okamoto | 123/357 |
| 4,590,908 | 5/1986 | Yoshinaga | 123/357 |

FOREIGN PATENT DOCUMENTS

| 51-34936 | 9/1976 | Japan | 123/357 |
| 0133440 | 8/1983 | Japan | 123/381 |
| 0185839 | 10/1984 | Japan | 123/381 |
| 60-233319 | 11/1985 | Japan | 123/357 |

Primary Examiner—Carl Stuart Miller
Attorney, Agent, or Firm—Cushman, Darby & Cushman

[57] ABSTRACT

A fuel injection control system for internal combustion engine comprises a fuel injection pump including a plunger slidably reciprocating in synchronism with rotation of the engine and a spill port establishing communication between a low pressure chamber and a pump chamber. An electronic control unit is responsive to engine operating conditions for the determination of fuel injection time period and controls the solenoid-operated valve to close the spill port in response to the requirement of fuel injection into the cylinder and open the same to terminate the fuel injection. The fuel injection control system further comprises a circuit including two fixed resistors and two adjusting resistors so that first and second voltage signals are developed at its terminals. The two adjusting resistors respectively determine the value of the voltage signals. The first voltage signal is regulated to correspond to the response time lag inherent in the solenoid valve and the second voltage signal is regulated to correspond to the error of the generation timing of the detection signal of a reference plunger position detector. The correction of fuel injection time period is made on the basis of the first and second voltage signals.

12 Claims, 7 Drawing Sheets

FUEL INJECTION CONTROL BASED ON SPILL PORT OPENING TIMING CORRECTIONpg,4

BACKGROUND OF THE INVENTION

The present invention relates to fuel injection control systems for internal combustion engines, and more particularly to a fuel injection system for diesel engines which controls the amount of fuel injected from a fuel injection pump into each cylinder by electronically controlling the opening and closing of a valve provided in a spill port communicating with a low pressure chamber defined in the fuel injection pump.

As one of devices for performing fuel injection into an internal combustion engine such as a motor vehicle diesel engine in accordance with the engine operating conditions is well known a spill type fuel injection device wherein the termination of fuel injection is effected by spilling fuel compressed for the injection into each cylinder of the engine. The spill type fuel injection device, as being illustrated in Japanese Patent Publication No. 51-34936, generally comprises a cam rotated in synchronism with rotation of the internal combustion engine, a fuel injection pump having a fuel-compressing plunger reciprocated in accordance with the rotation of the cam, a detector for detecting a reference rotational angle position established in corresponding relation to the vicinity of bottom dead center of the plunger and generating a signal in repsonse to the detection, and a solenoid-operated valve for performing the opening and closing of a spill port establishing communication between a pump chamber of the fuel injection pump and a low-pressure chamber defined in the fuel injection pump. The opening timing of the solenoid-operated valve is controlled by a control unit in which the duration for fuel injection is calculated on the basis of the engine operating conditions and a control signal indicative of the opening of the solenoid-operated valve is generated at the time elapsed by the calculated duration from the time of the generation of a detection signal from the reference rotational angle position detector.

However, such a fuel injection device provides problems in that: (1) a response time lag is occurred between the generation of a control signal indicative of the opening of the solenoid-operated valve and the actual opening thereof and the response time lag assumes a diferent value for each of fuel injection devices; and (2) an error of generation timing of the detection signal is caused by the fitting error of the reference rotational angle position detector occurred on manufacturing and the fitting error varies widely. These problems result in variations or dispersion of fuel injection amount although engines are respectively in the same operating condition.

SUMMARY OF THE INVENTION

The present invention has been developed in order to eliminate the above-described disadvantages inherent in the prior art fuel injection systems.

A primary object of the invention is therefore to provide a new and improved fuel injection control system which is capable of obtaining a fuel injection amount appropriately corresponding to an engine operating condition irrespective of the occurrence of response time lag and the error of generation timing of the detection signal with respect to the reference position of the plunger.

Another object of the invention is to provide a fuel injection control system which is capable of maintaining the accuracy in fuel injection amount irrespective of the secular change of the fuel injection device.

A further object of the invention is to provide a fuel injection control system continuously keeping the reliability after placed on the market.

A still further object of the invention is to provide a fuel injection control system which is capable of easily correcting the fuel injection amount on the adjustment process without regard to the dispersion of characteristics occured among fuel injection devices.

With these and other objects which will become apparent as the description proceeds, a fuel injection control system for an internal combustion engine according to the present invention comprises a fuel injection device basically including a plunger rotatably and slidably reciprocable in synchronism with rotation of the engine for introducing fuel into a high pressure chamber and feeding the fuel under high pressure from the high pressure chamber to any one of cylinders of the engine. The high pressure chamber is coupled to a spill port communicating with a low pressure chamber and the spill port is opened or closed by a solenoid-operated valve in accordance with instructions from an electronic control unit. The electronic control unit controls the solenoid-operated valve to close the spill port in response to the requirement of fuel injection into the cylinder and open the same to terminate the fuel injection. The control unit is responsive to engine operating conditions for the determination of fuel injection time period.

According to a feature of the present invention, the fuel injection control system further comprises a circuit including two fixed resistors and first and second adjusting resistors so that two voltage signals are developed. The two adjusting resistors are respectively attached to the fuel injection device and the resistance values thereof respectively determine the values of the two voltage signals. The two voltage signals are supplied to the electronic control unit and are used for correcting the errors of the fuel injection time period resulting from the response time lag of the solenoid-operated valve and the discrepancy of generation timing of a detection signal indicative of a reference position of the plunger. One of the two adjusting resistors is adjusted with respect to its resistance value so that one of the two voltage signals corresponds to the response time lag and the other is adjusted so that the other voltage signal corresponds to the discrepancy of generation timing. The electronic control unit determines correction values from the two voltage signals and corrects the fuel injection time period on the basis of the determined correction values so that fuel injection amount accurately corresponding to the engine operating condition can be obtained irrespective of the response time lag and discrepancy of the generation timing.

Thus, the present invention not only makes it possible to prevent the fuel injection from being affected by the response time lag and discrepancy of detection signal generating timing, but also makes possible to ensure an accurate fuel injection with a simple circuit arrangement.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
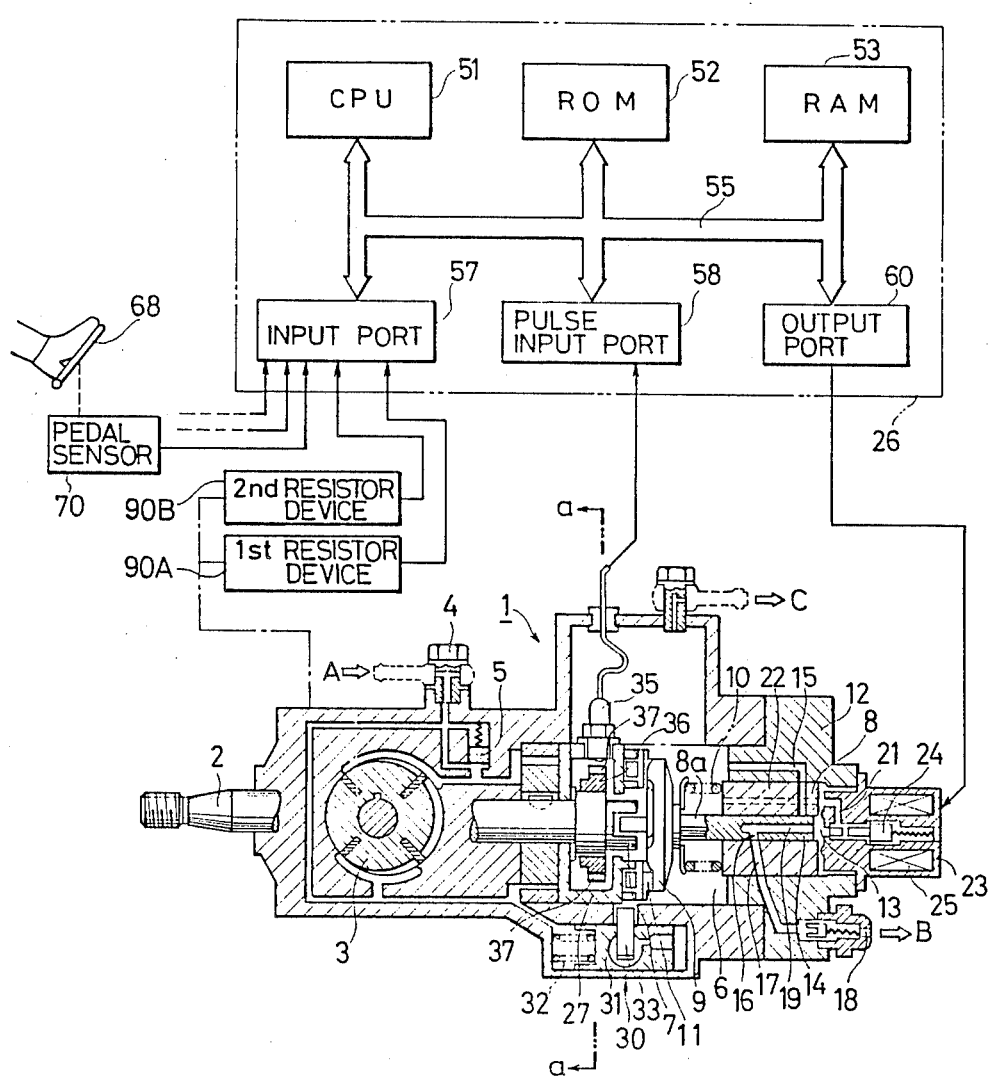
FIG. 1 is a schematic block diagram of a fuel injection control system according to the present invention.

Referring now to FIG. 1, there is schematically illustrated a fuel injection control system according to the present invention which will be applied to an internal combustion engine of a motor vehicle.

The fuel injection control system includes a fuel injection device 1 which is constructed on the basis of the known Bosch distribution type injection pump. The fuel injection device 1 comprises a drive shaft 2 operatively coupled to the crankshaft (not shown) of the internal combustion engine for driving a vane type feed pump 3. The vane type feed pump 3 introduces fuel from a fuel tank (not shown) through an inlet port 4 as indicated by an arrow A and supplies the introduced fuel under pressure controlled by a regulating valve 5 to a fuel chamber 6 defined in the fuel injection device 1. The drive shaft 2 drives a plunger 8a of a plunger pump 8, which acts as a fuel supply pump, by means of a coupling 7. The coupling 7 is arranged to rotate the plunger 8a together with the drive shaft 2 in rotating direction and allow the plunger 8a to be separately movable in the horizontal direction (axially). A face cam 9 is integrally coupled to the plunger 8a and is brought into contact with a cam roller 11 under the bias force of a spring 10 whereby the plunger 8a is reciprocated in the left and right directions in the Figure in response to the rotation of the drive shaft 2. The reciprocation movement of the plunger 8a is performed by the number equal to the number of the cylinders of the internal combustion engine. The plunger 8a is coaxially slidably coupled to an elongated hole defined in the head portion 12 of the fuel injection device 1 so that a pump chamber 13 is defined by the end surface of the plunger 8a and the inner surface of the elongated hole. Intake holes 14 are defined at the end portion of the plunger 8a and one of the intake holes 14 communicates with a intake port 15 provided in the head portion 12 on intake stroke, i.e., in moving in the left direction in the Figure whereby fuel is fed from the fuel chamber 6 to the pump chamber 13. Fuel compressed on compressing stroke, i.e., in moving in the right direction in the Figure is supplied under pressure through a fuel passage 19 and a distribution port 16 to an injection passage 17 and is injected through an injection nozzle (not shown) into a cylinder of the internal combustion engine after passing through a delivery valve 18 in the direction of an arrow B.

The pump chamber 13 is communicated through spill ports 21 and 22 with the fuel chamber 6 and the spill port 21 is opened or closed by means of a solenoid-operated valve 23 in which a needle valve 24 is lifted in response to the energization of an electromagnetic coil 25. The lifting of the needle valve 24 results in establishing communication between the pump chamber 13 and the fuel chamber 6. That is, with the solenoid-operated valve 23 being energized on the compressing stroke of the plunger 8a, fuel compressed within the pump chamber 13 flows through the spill ports 21, 22 to the fuel chamber 6 acting as a low pressure chamber, resulting in stopping fuel supply to the injection passage 17 and in termination of fuel injection into the cylinder. Fuel injection amount control is effected on the basis of this principle. A part of fuel spilled from the pump chamber 13 flows through an outlet port in the direction indicated by an arrow C and is returned to a fuel tank (not shown) of the motor vehicle.

The cam roller 11 is mounted on a roller ring 27 which is associated with a fuel injection timing control mechanism (so-called timer) 30. The fuel injection timing control mechanism 30 comprises a timer piston 31, the end surface of which is responsive to the pressure of fuel in the fuel chamber 6. The pressure in the fuel chamber 6 varies in accordance with engine speed, i.e., the rotational speed of the feed pump 3. The timer piston 31 is moved against the bias force of a spring 32 in the left direction of the Figure in response to the fuel pressure being applied to the end surface thereof. The reciprocating movement of the timer piston 31 is transferred through a pin 33 to the roller ring 27. In the Figure, the timer piston 31 is shown as being rotated 90 degrees from actual position and therefore the reciprocating movement of the timer piston 31 causes the rotational movement of the roller ring 27 about the drive shaft 2. The angular position of the cam roller 11 is rotated together with the roller ring 27 and is relatively varied with respect to the face cam 9, resulting in the variation of timing at which the rising portion of the face cam 9 runs on the cam roller and the variation of phase of the reciprocating movement of the plunger 8a with respect to the drive shaft 2. Therefore, since the variation causes the variation of the timing establishing communication between the distribution port 16 and the injection passage 17, the fuel injection timing is automatically adjusted. On the roller ring 27 is mounted a timing detector 35 such as electromagnetic type detector, Hall generator type detector and optical angle detector. On the other hand, a toothed wheel member 36 is coaxially fixedly mounted on the drive shaft 2 to be rotated in accordance with the rotation of the drive shaft 2 and is arranged to indicate a reference rotational angular position in association with the the timing detector 35. That is, a signal indicative of a reference rotational angular positon is generated in response to a projection of the toothed wheel member 36 running across the timing detector 35. The signal is supplied to an electronic control unit 26 and is used as a reference signal for controlling the opening and closing of the solenoid-operated valve 23.

The operation of the fuel injection timing control mechanism 30 causes rotation of the roller ring 27 and further results in rotating the timing detector 35 by the same phase as the roller ring 27. With this arrangement, the generation timing of a reference signal to the electronic control unit 26 is varied by the same phase in response to the fuel injection timing being varied, and as a result of the variation, the operation timing of the solenoid-operated valve 23 is varied and the spill timing of fuel is also varied by a value corresponding to a rate of variation of the operation timing of the plunger 8a. This means that the amount of fuel to be injected is maintained.

The electronic control unit 26 comprises a microcomputer including a central processing unit (CPU) 51. Signals to and from the CPU 51 are carried along a data bus 55 to which are coupled the associated units including a read-only memory (ROM) 52, a random access memory (RAM) 53, an input port 57, a pulse input port 58, and an output port 60. The input port 57 has an analog-to-digital converter which is coupled to various sensors for detecting engine operating conditions such as an accelerating pedal sensor 70 for sensing the operating amount of an accelerating pedal 68, a rotational speed sensor (not shown) for detecting the rotational angle of the engine, and a temperature sensor for sensing the temperature of intake air. Also coupled the A/D converter to first and second resistor devices 90A and 90B which will be hereinafter described in detail. The pulse input port 58 is connected to the timing detector 35 and is arranged to detect a pulse signal indicative of a rotational phase of the face cam 9 of the fuel injection device. On the other hand, the output port 60 has a counter for setting fuel injection time $\tau$ in accordance with instructions from the CPU 51. The counter generates a signal for energizing the coil 25 of the solenoid-operated valve 23 to control the opening and closing thereof.

The following is a description of the technique for detecting the rotational phase of the face cam 9, i.e., the rotational phase of the drive shaft 2 by obtaining the pulse signal from the timing detector 35. An output signal of the timing detector 35 obtained in relation to the rotation of the drive shaft 2 indicates a reference position employed for the fuel injection amount control and the fuel injection amount (injection time) is based on the output signal.

Figure 2:
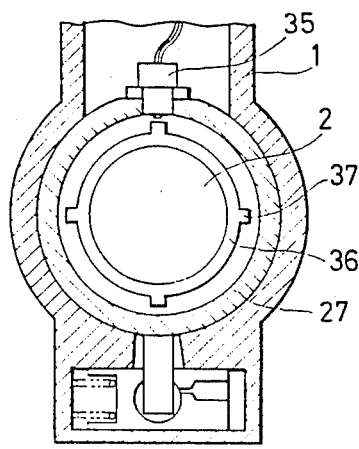
FIG. 2 is a cross-sectional view taken along line a—a of FIG. 1.

FIG. 2 is a cross-sectional view taken along the line a—a of FIG. 1. The toothed wheel member 36 has four projections 37 equally spaced, and is mounted on the drive shaft 2 such that each of the projections 37 extremely approaches the timing detector 35 when the plunge 8a driven by the face cam 9 is positioned to its bottom dead center. Therefore, the timing detector 35 generates a signal at the time fuel compression is initiated by the plunger 8a.

Figure 3:
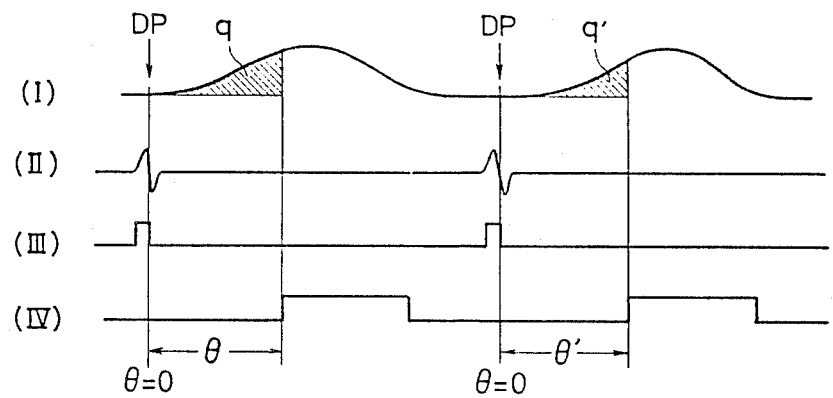
FIG. 3 is a timing chart useful for understanding the relationship between the reference position signal and the operation of the plunger.

FIG. 3 is a timing chart useful for understanding the relationship between the reference position signal and the operation of the plunger.

In FIG. 3, the reference numeral (I) represents the operating amount of the plunger 8a. The reference character DP designates a bottom dead center of the plunger 8a and therefore a detection signal is generated at the time by the timing detector 35 as indicated by the reference numeral (II). The detection signal is shaped by a waveshaper of the pulse input port 58 into a pulse signal as indicated by the numeral (III). The reference numeral (IV) represents a control signal applied to the solenoid-operated valve 23. The control signal is generated after elapsed by a rotational angle $\theta$ or $\theta'$ from a reference point ($\theta=0$) corresponding to the bottom dead center of the plunger 8a. In response to the generation of the control signal, the needle valve 24 of the solenoid-operated valve 23 is opened whereby compressed fuel is spilt through the spill ports 21 and 22 to the low pressure chamber to terminate the fuel injection. The hatching portions indicated by reference characters q and q' depict the amount of fuel injected into the cylinder of the engine.

Figure 4:
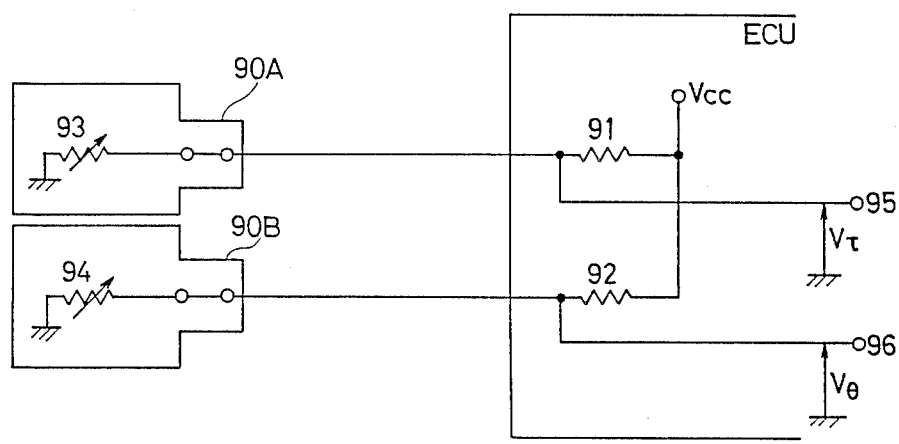
FIG. 4 is a circuit arrangement for compensating the response time lag of the solenoid-operated valve and the discrepancy of generation timing of a detection signal indicative of a reference position of the plunger.

FIG. 4 is a circuit arrangement for compensating the response time lag of the solenoid-operated valve and the discrepancy of generation timing of a detection signal indicative of a reference position of the plunger.

The circuit of FIG. 4 comprises fixed resistors 91, 92 and adjusting resistors 93, 94. The fixed resistors 91 and 92 are provided in the electronic control unit 26 and the adjusting resistors 93 and 94 are respectively encased in the first and second devices 90A and 90B which are attached to the fuel injection device 1. Denoted at the reference character Vcc is a constant voltage (5 V, for example) to be applied to this circuit, and therefore, a voltage $V\tau$ divided by the resistors 91 and 93 appears at an output terminal 95 and a voltage $V\theta$ divided by the resistors 92 and 94 appears at an output terminal 96. It is possible to use a variable resistor for each of the adjusting resistors 93 and 94. However, since the resistors 93 and 94 are mounted on a motor vehicle, it would be appropriate to adjust the resistance value by replacing a fixed resistor with another fixed resistor.

A description for the resistor devices 90A and 90B will be made with refernce to FIGS. 5 and 6.

Figure 5:
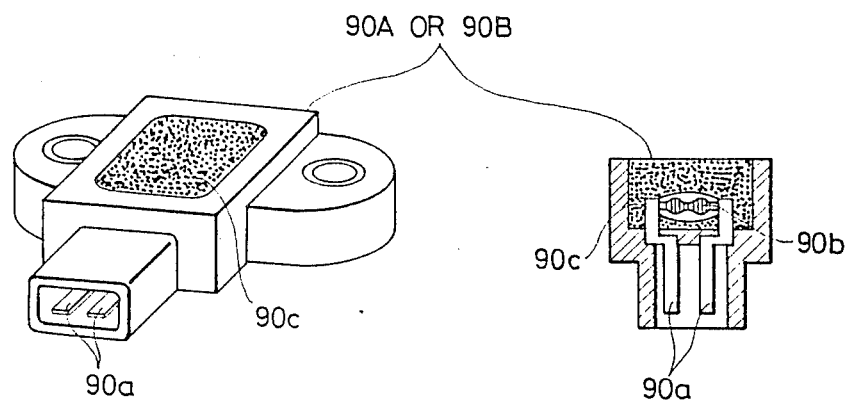
FIG. 5 is an illustration of a connector encasing a resistor of the circuit of FIG. 4.
Figure 6:
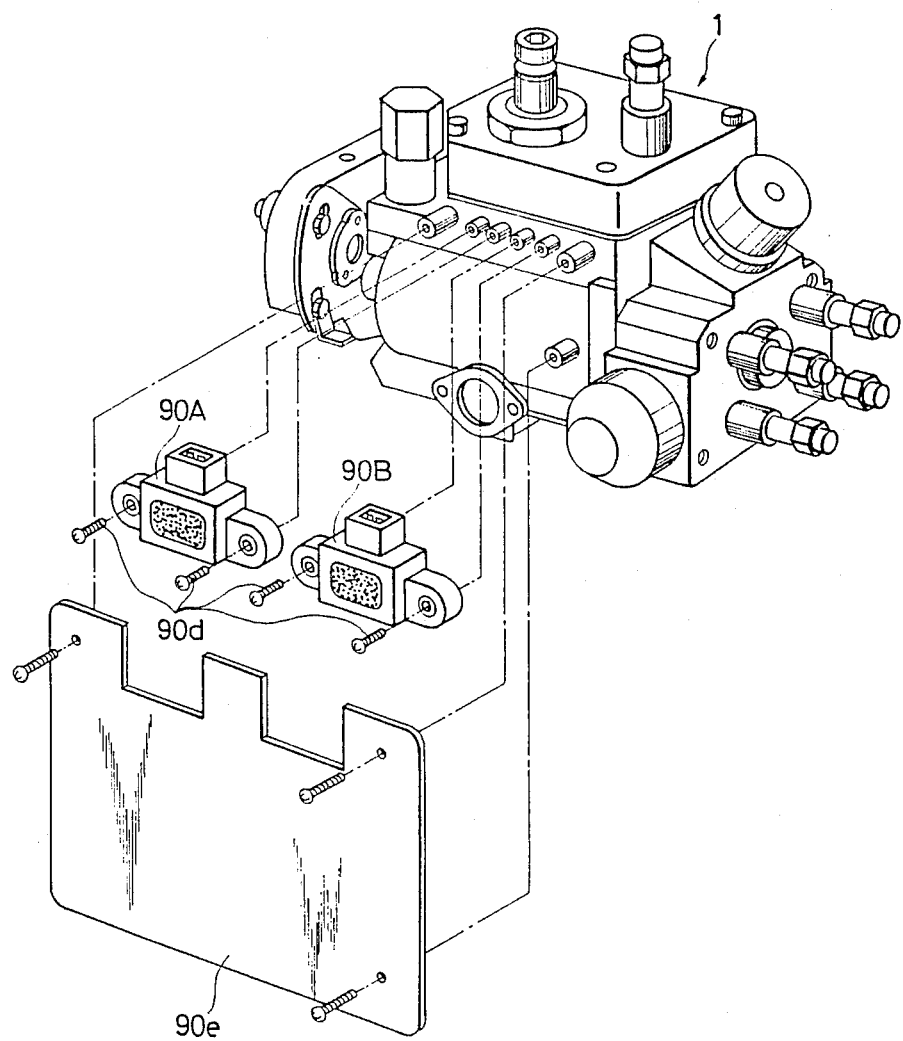
FIG. 6 is an illustration of the connectors to be attached to the fuel injection device.

The resistor device 90A or 90B, as illustrated in FIG. 5, comprises metallic members 90a and a fixed resistor 90b connected between one ends of the metallic members 90c. The resistor-connected portion is filled with a resin 90c. The resistor devices 90A and 90B are mounted on the fuel injection device 1 using screws 90d as illustrated in FIG. 6 after appropriately selected on the fuel injection device regulating process. A metallic plate 90e is used for the protection of the resistor devices 90A and 90B.

Figure 7:
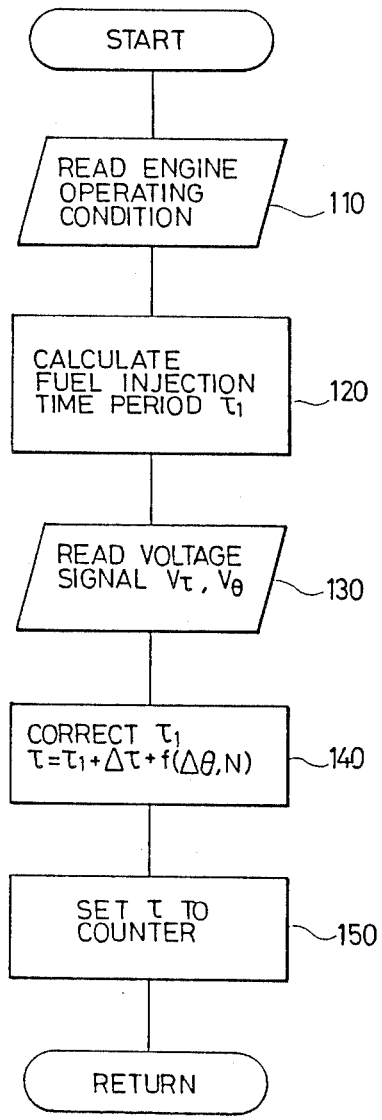
FIG. 7 is a flow chart describing the fuel injection control according to the present invention.

FIG. 7 is a flow chart describing the fuel injection control according to the present invention.

Figure 8:
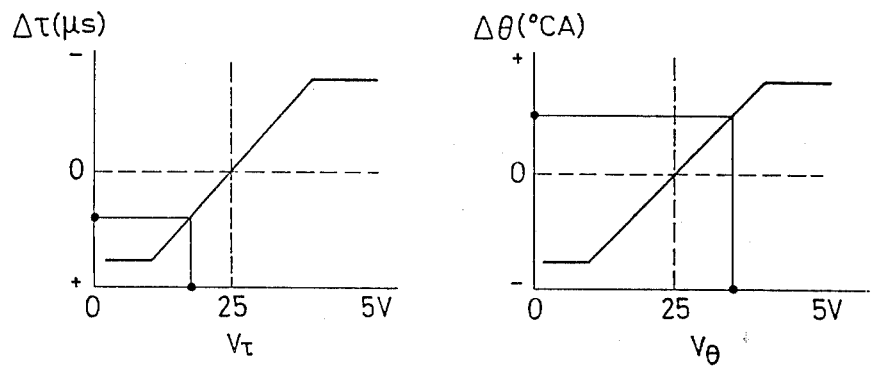
FIG. 8 shows the corresponding relation between the voltage signals of the circuit of FIG. 4 and the response time lag of the solenoid-operated valve, the descrepancy of generation timing of reference position indicating signal.

The routine illustrated in FIG. 7 is initiated by the electronic control unit 26, i.e., microcomputer in resonse to the turning-on of the ignition switch of a motor vehicle. This routine starts with a block 110 in which various data indicative of engine operating conditions are read from the input port, the various data including the operating amount of the accelerating pedal 68, and engine speed. A subsequent block 120 is executed for performing the calculation for fuel injection control on the basis of the engine operating condition obtained in the previous block 110. That is, a fuel injection amount is derived as a function of the operating amount of the accelerating pedal 68 and a fuel injection time period $\tau_1$ corresponding to the derived fuel injection amount is calculated on the basis of the obtained engine speed. The fuel amount discharged during one stroke of the plunger 8a is constant and fuel amount to be injected into a cylinder increases in accordance with the increase in engine speed. That is, the increase in speed results in reduction in fuel injection time period necessary for discharging the same fuel amount. A block 130 follows to read voltage values $V\tau$ and $V\theta$ determined by the regulation of resistors 93 and 94 of FIG. 4 which will be hereinafter described. Control advances to a block 140 which is provided for correcting the fuel injection time period obtained in the block 120 on the basis of the voltage values $V\tau$ and $V\theta$ and calculating an actually injected time period. This is based on the fact that the voltage value $V\tau$ corresponds to the response time lag $\Delta\tau$ of the solenoid-operated valve 23 and the voltage value $V\theta$ corresponds to the difference $\Delta\theta$ with respect to rotational angle between the generation of output signal of the timing detector 35 and the bottom dead center position of the plunger 8a. The corresponding relation between $V\tau$, $\Delta\tau$, $V\theta$ and $\Delta\theta$ can be predetermined as being illustrated in FIG. 8 and if the corresponding relation is stored as a map or maps in the ROM 52, $\Delta\tau$ and $\Delta\theta$ are respectively obtained on the basis of $V\tau$ and $V\theta$. The correction of the fuel injection time period obtained in the block 120 is made using $\Delta\tau$ and $\Delta\theta$, that is, the generation timing $\tau$ of a control signal indicative of the opening of the solenoid-operated valve 23 (an actual fuel injection time period) is given by, for example, the equation $\tau=\tau 1+\Delta\tau+f(\Delta\theta, N)$ where $f(\Delta\theta, N)$ is a value derived as a function of $\Delta\theta$ and N and N is an engine speed obtained in the bolck 110. A subsequent block 150 is executed to set a value corresponding to the timing $\tau$ obtained in the block 140 to a down-counter provided in the output port 60, and after the execution of the block 150, this routine is terminated.

The actual fuel injection control is performed in accordance with the other routine (not shown), wherein the solenoid-operated valve 23 is opened in response to a control signal generated after elapsed by the time $\tau$ set in the down-counter from the time that a detection signal is generated by the timing detector 35, so that the fuel injection is terminated by the spilling of compressed fuel made through the spill ports 21 and 22.

Accordingly, where voltage signals $V\tau$ and $V\theta$ are determined so as to correct fuel spill timing by $\Delta\tau$ corresponding to a response time lag inherent in the solenoid-operated valve 23 and $\Delta\theta$ corrsponding to a discrepancy with respect to rotational angle between the generation timing of the output signal of the timing detector 35 and the bottom dead center of the plunger 8a, an accurate fuel injection control can be performed irrespective of the inconsistency of characteristics of the fuel injection devices because the fuel spill timing is corrected in accordance with the error amount inherent in each of the fuel injection devices.

The following is a description of the technique for the adjustment of a fuel injection device, i.e., the determination of $V\tau$ and $V\theta$, which will be effected on the adjusting process.

The solenoid-operated valve 23 is first removed from the fuel injection device 1 and a solenoid-operated valve for adjustment, which is accurately controlled with respect to the response time lag, is alternatively provided therein. $V\tau$ is set to a reference value for the adjustment valve (for example, 2.5 V) by adjusting the resistance value of the resistor 93 and the internal combustion engine is operated with predetermined engine speed and load. For example, with the engine speed being 350 rpm and the accelerating pedal depressing amount being zero level, the voltage signal $V\theta$ is set by adjusting the resistance value of the adjusting resistor 94 so that the discharge amount is set to a calculated value 12 mm$^3$/ one stroke under control of an electronic control unit for adjustment. With this adjusting method, corrected is the discrepancy ($\Delta\theta$) of the detection signal of the timing detector 35 generated in relation to the bottom dead center of the plunger 8a. Thereafter, the solenoid-operated valve for adjustment is removed and the actually used solenoid-operated vlave 23 is attached thereto. The voltage signal $V\tau$ is similarly set by adjusting the regulating resistor 93 so as to correct the spill timing by $\Delta\tau$ corresponding to the response time lag of the solenoid-operated valve 23.

As described above, the correction of the fuel injection amount can be made with four resistors, i.e., simple arrangement, resulting in increase in reliability and durability.

Figure 9:
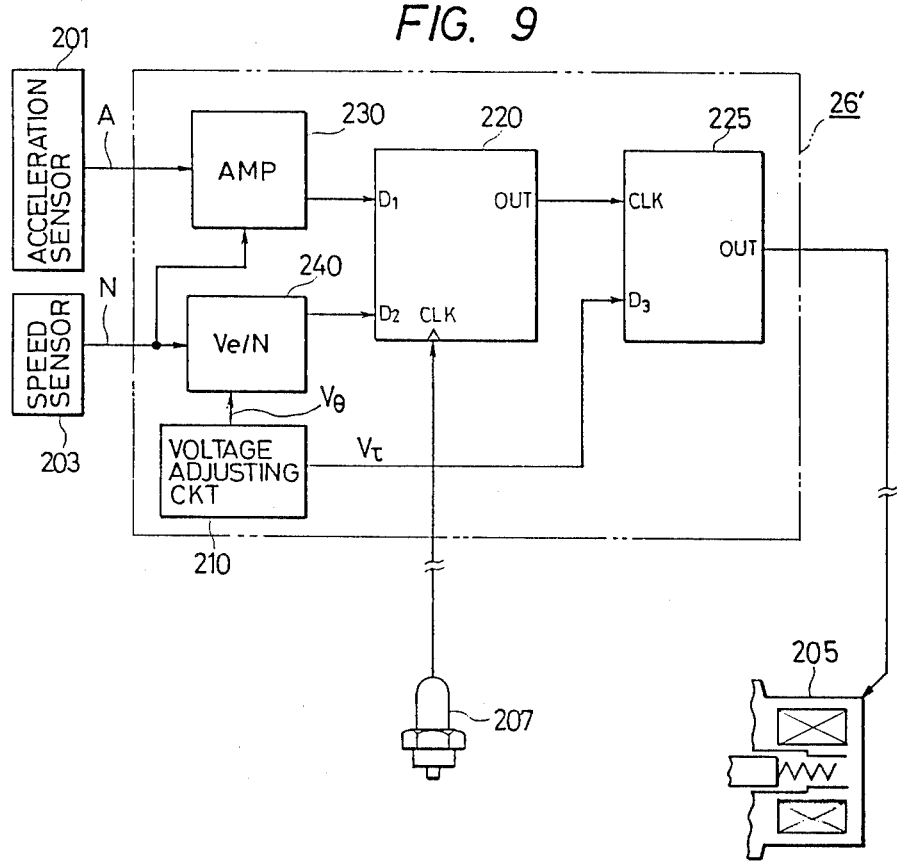
FIG. 9 is an illustration of another example of the electronic control unit of FIG. 1.

In the above-described embodiment, the electronic control unit 26 comprises the CPU for digital control. However, the objects of the present invention can be achieved by having a circuit arangement as illustrated in FIG. 9, which includes delay circuits 220, 225, an amplifier circuit 230, and a division circuit 240. The amplifier circuit 230 is responsive to the output A of an acceleration sensor 201 (corresponding to the accelerating pedal sensor 70) for amplification and supplying a first delay amount control terminal D1 of the delay circuit 220 with a signal corresponding to the operating amount of the accelerating pedal after a fuel injection time period is calculated as a function of the output signal N of a rotational speed sensor 203. The division circuit 240 divides the votage signal $V\theta$ from a voltage adjusting circuit 210 (correspsonding to the circuit of FIG. 4) by the output signal N of the rotational speed sensor 203 to convert the discrepancy of the timing detector 207 (corresponding to the timing detector 35) with respect to rotational angle into a correction amount for the fuel injection time period. The output signal of the division circuit 240 is fed to the other delay amount control terminal D2 of the delay circuit 220 and the delay circuit 220 switches the voltage of an output terminal OUT from a low level to a high level after elapsed by the time period determined on the basis of the signals inputted in the delay amount control terminals D1 and D2 from the time a pulse signal from the timing detector 207 is inputted into a triggering terminal CLK. The delay circuit 225 is reponvise of the high level voltage of the output terminal OUT and terminates the fuel injection by generating a control signal indicative of the opening of a solenoid valve 205 from the output terminal OUT thereof to the solenoid valve 205 after the elapse of the time period corresponding to the voltage signal $V\tau$ inputted into a delay amount control terminal D3.

If the electronic control unit 26 is arranged as illustrated in FIG. 9, the circuit arrangment thereof becomes simple because it can be constructed without using a CPU and so on, resulting in reduction in manufacturing cost.

Figure 10:
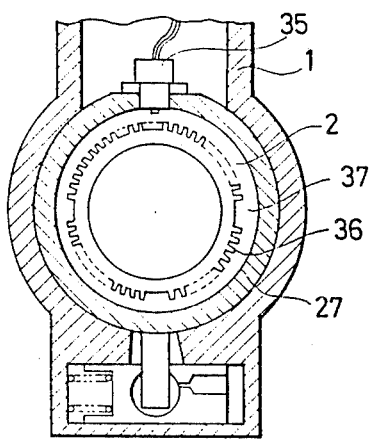
FIG. 10 illustrates another arrangement of the reference position detector.
Figure 11:
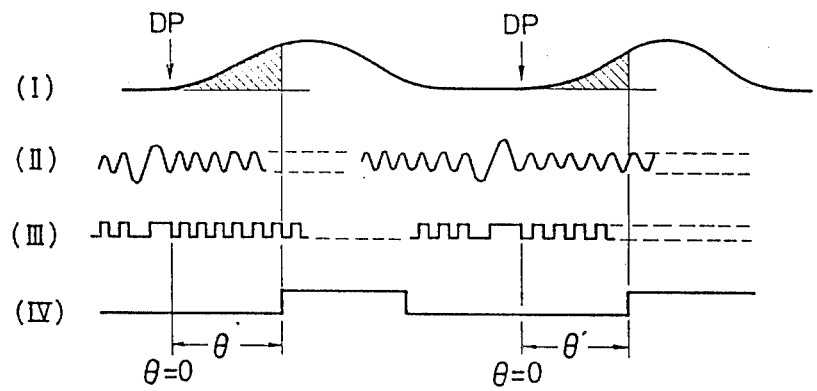
FIG. 11 is a timing chart useful for describing the fuel injection control performed in accordance with the reference position detector of FIG. 10.

FIG. 10 illustrates another example of the reference angular position detector comprising a timing detector 35 and a toothed wheel 36 having a plurality of teeth 37. The tooth or teeth corresponding to the bottom dead center position of the plunger is removed. With such a arrangement of the electromagnetic pick-up, signal indicated by the reference character (II) in FIG. 11 is obtained therefrom in response to the movement of the plunger indicated by the character (I), wherein the character DP represents the bottom dead center position of the plunger. The signal from the timing detector 35 is shaped into a pulse signal as indicated by the reference character 3. The trailing edge of a pulse having a relatively great pulse duration which is generated in relation to each of the tooth-removed portions is detected as a reference point and the rotational angle can detected by counting pulses generated after the reference point. This arrangement results in more accurate rotational angle detection as compared with the arrangement above described with reference to FIG. 2.

According to the present invention, the discrepancy of the characteristics of fuel injection devices is compensated on the basis of $V\tau$ and $V\theta$ and therefore interchangeability between the fuel injection devices can be ensured.

Furthermore, if either of $\Delta\tau$ and $\Delta\theta$ can be mechanically corrected, it is appropriate that only the remaining error is corrected. It is also appropriate that the fuel spill timing thus corrected is stored in a memory and thereafter the fuel injection control is performed in accordance with the first corrected fuel spill timing.

It should be understood that the foregoing relates to only preferred embodiments of the invention, and that it is intended to cover all changes and modifications of the embodiments of the invention herein used for the purpose of the disclosure, which do not constitute departures from the spirit and scope of the invention.

What is claimed is:

1. A fuel injection control system for an internal combustion engine, comprising:
   (a) a fuel injection pump including:
      a pump chamber;
      a low pressure chamber;
      plunger means reciprocating in synchronism with rotation of said engine for introducing fuel into said pump chamber, and for feeding said fuel under pressure from said pump chamber to a cylinder of said engine,
      detector means for detecting a reference position of said plunger, and for generating a detection signal indicative of the reference position, and
      a spill port coupled to said pump chamber and in communication with said low pressure chamber,
   (b) solenoid valve means for opening and closing said spill port;
   (c) first circuit means including first and second adjusting resistors, said first circuit means being replaceably disposed on said fuel injection pump;
   (d) first control means for calculating a fuel injection time period according to operating conditions of said engine;
   (e) second control means including second circuit means comprising first and second fixed resistors, said first fixed resistor being connected to said first adjusting resistor so as to produce a first voltage signal corresponding to a ratio of a resistance value of said first adjusting resistor to a resistance value of said first fixed resistor, said second fixed resistor being connected to said second adjusting resistor so as to produce a second voltage signal corresponding to a ratio of a resistance value of said second adjusting resistor to a resistance value of said second fixed resistor, said second control means correcting said calculated fuel injection time period based on said first and second voltage signals, said second control means being positioned together with said first control means and apart from said first circuit means; and
   (f) third control means for controlling said solenoid valve means to close said spill port for said corrected fuel injection time period and to open said spill port after elapse of said corrected fuel injection time period.

2. A fuel injection control system as claimed in claim 1, wherein said circuit means is arranged to adjust the voltage value of said first voltage signal by changing the resistance value of said first adjusting resistor and to adjust the voltage value of said second voltage signal by changing the voltage value of said second adjusting resistor.

3. A fuel injection control system as claimed in claim 2, wherein said first voltage signal is adjusted to correspond to the response time lag inherent in said solenoid valve means and said second voltage signal is adjusted to correspond to the error of the generation timing of the detection signal of said detector means with respect to the reference position of said plunger means.

4. A fuel injection control system as claimed in claim 2, further comprising memory means, and wherein the corresponding relations between said first voltage signal, the response time lag and said second voltage signal, the error are in advance stored in said memory means.

5. A fuel injection control system as claimed in claim 4, wherein the correction of the fuel injection time period is made on the basis of the error value and the response time lag value which are obtained as a function of the voltage values of said first and second voltage signals.

6. A fuel injection control system as claim in claim 4, wherein the correction of the fuel injection time period is made on the basis of a value derived as a function of error value and a rotational speed of said engine.

7. A fuel injection control system as claimed in claim 1, wherein said first and second adjusting resistors are respectively encased in housings and said housings are detachably connected to said fuel injection pump.

8. A fuel injection control system for an internal combustion engine, comprising:
   (a) a fuel injection pump including:
      a pump chamber;
      a low pressure chamber;
      plunger means reciprocating in synchronism with rotation of said engine for introducing fuel into said pump chamber, and for feeding said fuel under pressure from said pump chamber to a cylinder of said engine,
      detector means for detecting a reference position of said plunger and for generating a detection signal indicative of said reference position, and
      a spill port coupled to said pump chamber and in communication with said low pressure chamber defined in said fuel injection pump,
   (b) solenoid valve means for opening or closing said spill port;
   (c) first circuit means including first and second adjusting resistors, said first and second adjusting resistors being exchangeably disposed on said fuel injection pump;
   (d) data processing means including second circuit means comprising first and second fixed resistors, said first fixed resistor being connected to said first adjusting resistor to produce a first voltage signal corresponding to a ratio of a resistance value of said first adjusting resistor to a resistance value of said first fixed resistor, said second fixed resistor being connected to said second adjusting resistor to produce a second voltage signal corresponding to a ratio of a resistance value of said second adjusting resistor and a resistance value of said second fixed resistor, said data processing means being positioned apart from said first circuit means, said data processing means including means for:
(1) detecting operating conditions of said engine;
(2) calculating a fuel injection amount based on said detected engine operating conditions;
(3) converting said calculated fuel injection amount into a fuel injection time period in accordance with a rotational speed of said engine;
(4) reading said first and second voltage signals;
(5) obtaining a response time lag of said solenoid valve means based on said first voltage signal;
(6) obtaining an error of a generation timing of said detection signal of said detector means with respect to said based said reference position of said plunger means;
(7) correcting said fuel injection time period based on said obtained response time lag and said obtained error; and
(8) controlling said solenoid valve means to open said spill port after elapse of said corrected fuel injection time period.

9. A fuel injection control system for an internal combustion engine, comprising:
a pump chamber;
a low pressure chamber;
(a) a fuel injection pump including:
plunger means reciprocating in synchronism with rotation of said engine for introducing fuel into said pump chamber, and for feeding the fuel under pressure from said pump chamber to a cylinder of said engine;
detector means for detecting a reference position of said plunger means, and for generating a detection signal indicative of said reference position, and
a spill port coupled to said pump chamber in communication with said low pressure chamber,
(b) solenoid valve means for opening or closing said spill port;
(c) circuit means including a fixed resistor and an adjusting resistor, said adjusting resistor being replaceably positioned on said fuel injection pump, said fixed resistor being positioned apart from said adjusting resistor but connected to said adjusting resistor to produce a voltage signal corresponding to a ratio of a resistance value of said adjusting resistor and a resistance value of said fixed resistor;
(d) first control means for calculating a fuel injection time period in accordance with operating conditions of said engine;
(e) second control means for correcting said calculated fuel injection time period by a correction value obtained based on said voltage signal; and
(f) third control means for controlling said solenoid valve means to close said spill port for said corrected fuel injection time period and to open said spill port after elapse of said corrected fuel injection time period.

10. A fuel injection control system as claimed in claim 9, wherein said correction value corresponds to a response time lag of said solenoid-operated valve.

11. A fuel injection control system as claimed in claim 9, wherein said correction value corresponds to an error of the generation timing of the detection signal of said detector means.

12. A fuel injection control system as claimed in claim 9, wherein said adjusting resistor is encased in a housing and said housing is detachably attached to said fuel injection pump.

* * * * *